United States Patent

[11] 3,581,090

| [72] | Inventor | Leonard Carlton Brown<br>Columbus, Ohio |
|---|---|---|
| [21] | Appl. No. | 588,199 |
| [22] | Filed | Oct. 20, 1966 |
| [45] | Patented | May 25, 1971 |
| [73] | Assignee | The United States of America, as represented by the United States Atomic Energy Commission. |

[54] UTILIZING PENETRATING RADIATION
16 Claims, 15 Drawing Figs.

[52] U.S. Cl. ................................................ 250/83.3,
250/71.5, 250/105, 250/106, 250/108, 324/99
[51] Int. Cl. ..................................................... G01t 1/20,
G01s 5/16
[50] Field of Search ........................................... 250/71.5,
83.3, 106, 108; 324/99; 250/105

[56] References Cited
UNITED STATES PATENTS

| 2,507,781 | 5/1950 | Glass | 324/99X |
| 3,041,454 | 6/1962 | Jones et al. | 250/83.3X |
| 3,123,714 | 3/1964 | Chope | 250/105X |
| 3,291,988 | 12/1966 | Chope et al. | 250/108X |
| 3,291,990 | 12/1966 | Lentz | 250/108X |
| 3,293,436 | 12/1966 | Wilcox | 250/83.3 |
| 3,315,076 | 4/1967 | Jordan | 250/106(T)X |
| 3,363,100 | 1/1968 | Cohen et al. | 250/71.5 |
| 3,436,539 | 4/1969 | Wilcox | 250/71.5 |

Primary Examiner—Archie R. Borchelt
Assistant Examiner—Morton J. Frome
Attorneys—Allan M. Lowe, K. Henry Peterson, William T. Fryer, III and James J. O'Reilly ABSTRACT: A system for determining the position of a plurality of objects carrying sources of radiation relative to a detector for said radiation includes means for modulating each of the radiation sources at a different frequency. The modulated radiation is received by an array including a plurality of mutually shielded detectors. Each detector feeds a voltage indicative of the amount of penetrating radiation impinging thereon to a computing network which derives visual signals indicative of the angular location and range of each object carrying a radiation source. Provision is made for eliminating background radiation from the signal derived from each of the detectors.

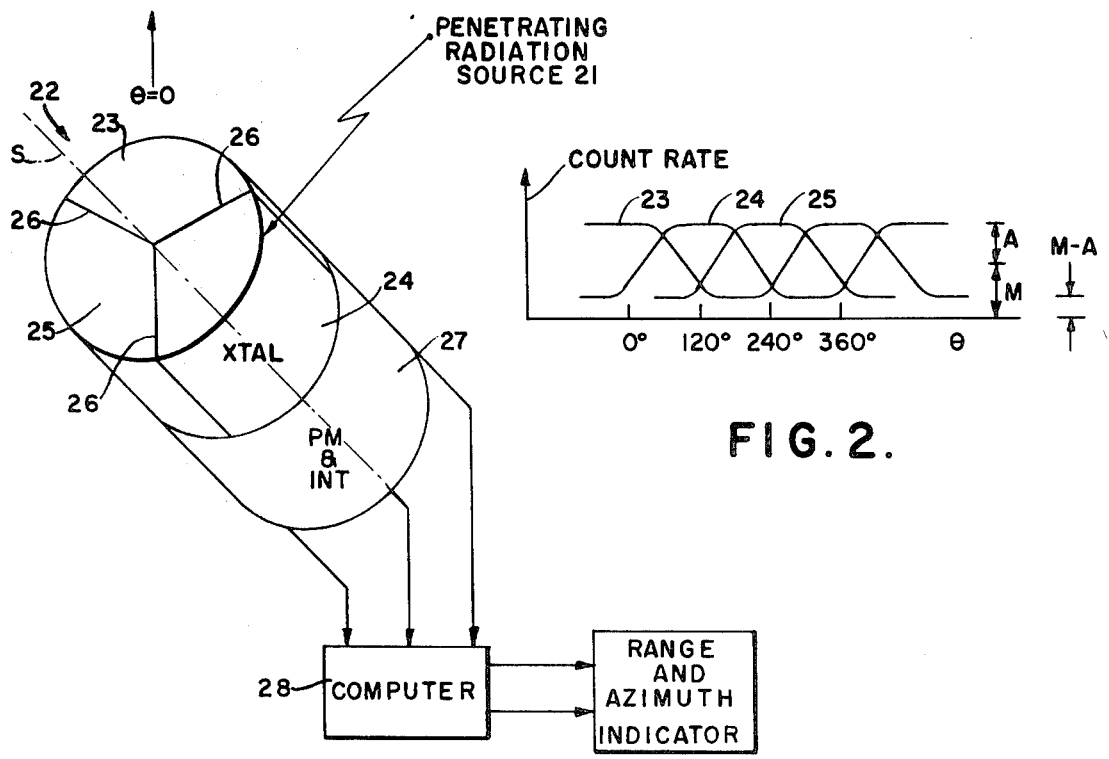
FIG. 2.
FIG. 1.
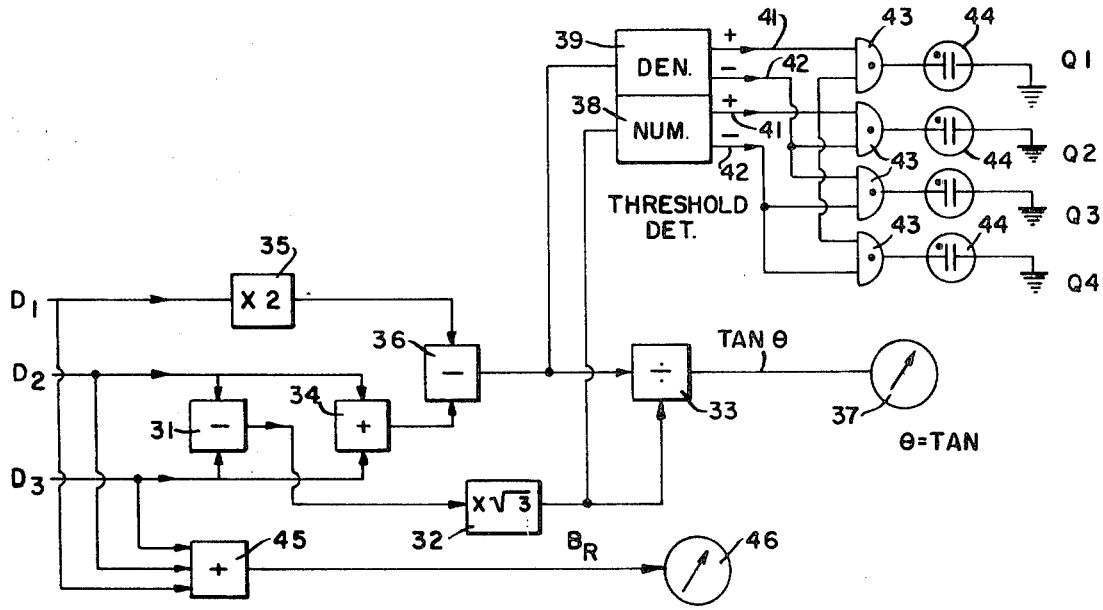
FIG. 3.
INVENTOR
Leonard C. Brown
BY *Allan M. Lowe*
ATTORNEY INVENTOR
Leonard C. Brown BY *[signature: Allan M. Lowe]*

ATTORNEY

INVENTOR
Leonard C. Brown
BY
ATTORNEY

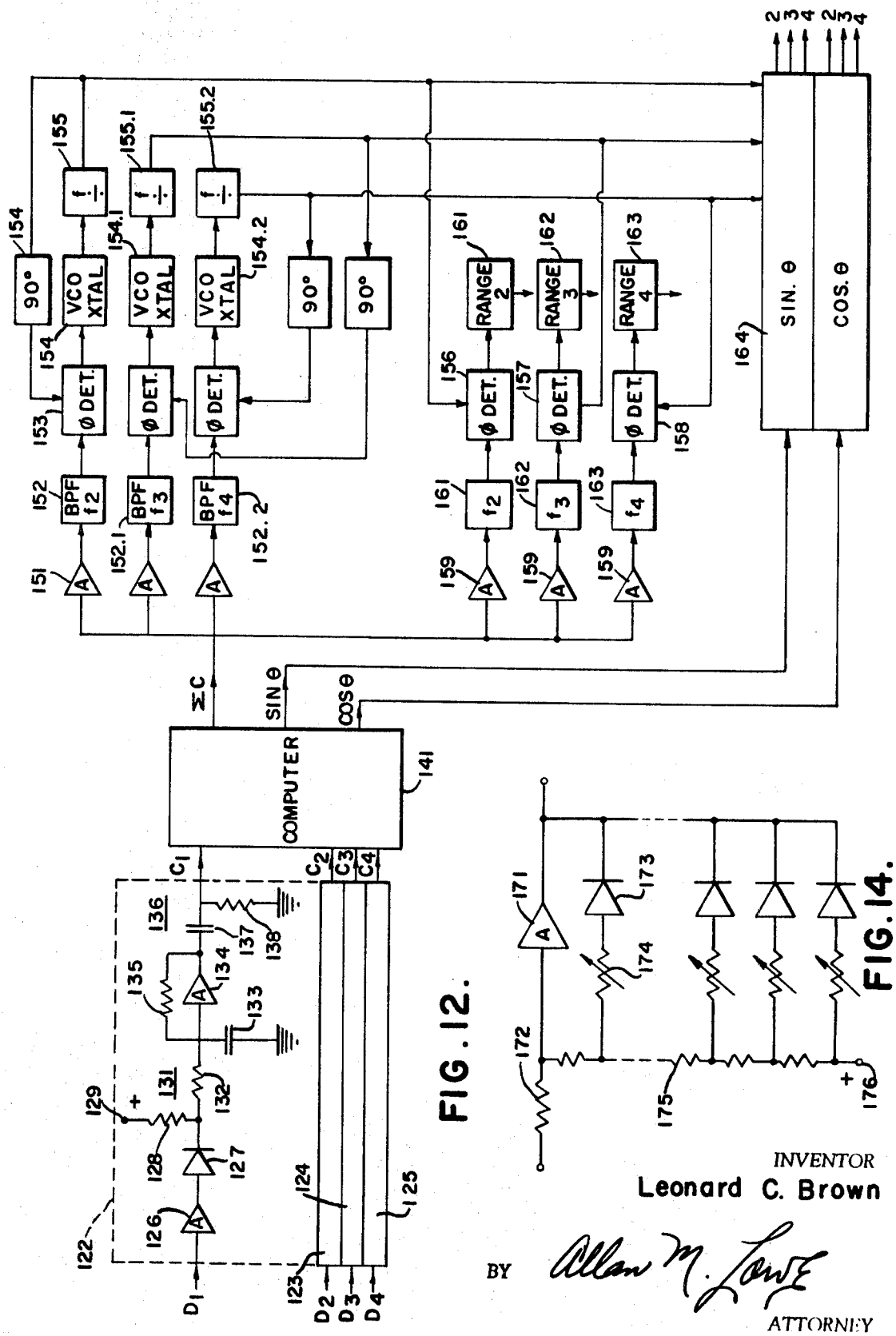

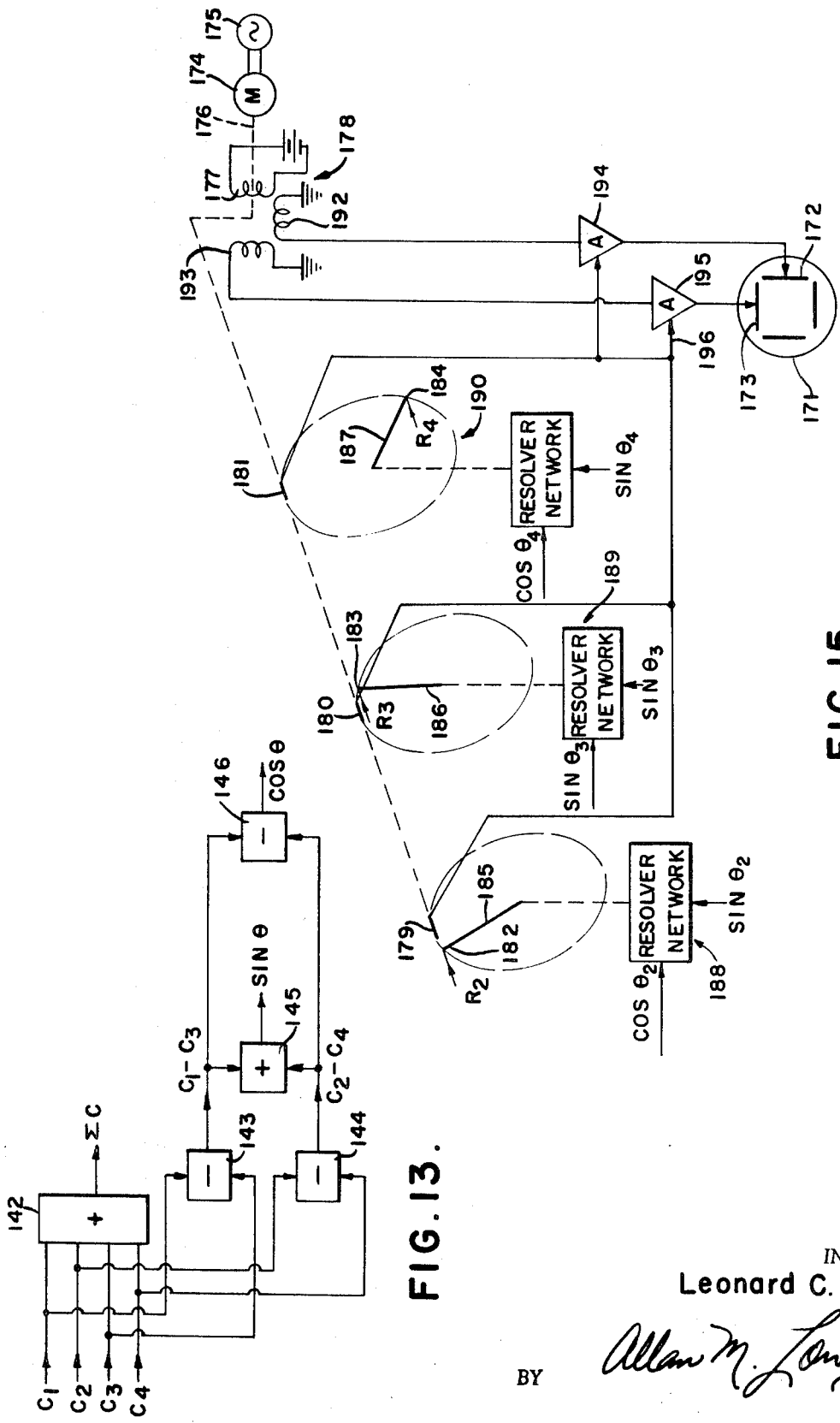

UTILIZING PENETRATING RADIATION

The present invention relates generally to systems for determining the relative range and angular position between a radiation source and detector, and more particularly to such a system having a stationary detector array responsive to penetrating radiation.

Systems for determining the position of an object by means of electromagnetic energy have generally fallen into three principal portions of the spectrum, namely: radiofrequencies (including microwaves), light (including infrared), and penetrating radiation. The term penetrating radiation as utilized in the specification and claims herein is defined as electromagnetic energy that: has a wavelength less than light; is penetrative of clouds and fog; is not capable of being readily focused; and is not substantially refracted or reflected from clouds and fog. Examples of radiation falling within the definition are X-rays and nucleonic energy sources.

Recently, the use of penetrating radiation has become more widely accepted for short range precise distance and angular position measurements because radiofrequency waves do not possess the resolution required, at short range, to obtain the necessary precision for many measurements. For example, in measuring distances as small as 5 feet with precision, radar techniques are virtually useless, and in fact radar is subject to serious errors for distances as short as 100 feet. While light wave energy is not subject to the same deficiencies of resolution as radar and other radiofrequency techniques, light waves do not propagate through clouds, but are absorbed, reflected and refracted thereby. Hence, with uncertain environments, the use of light waves is impractical.

Penetrating radiation, however, is not subject to the deficiencies of radiofrequency and light wave energies if short range measurements are required. Range can be measured utilizing penetrating radiation because the radiation level from a calibrated source decreases in a precise mathematically defined manner as a function of distance. Angular position of a radiation source can be determined by utilizing a detector array having a plurality of scintillation crystals shielded from each other. The crystals pointed toward the source and shield effectively shadow crystals in the array that do not receive direct radiation from the source, whereby differences between the outputs of the crystals provide an indication of the angle of the source relative to the array.

To determine the range, i.e., distance, and angle between a pair of objects according to the present invention, one of the objects is provided with a source of penetrating radiation such as X-rays or nuclear radiation and the other object has located thereon a fixedly mounted or stationary shielded array of scintillation crystal detectors. Nuclear sources providing gamma radiation are preferred; Americium 241, cesium 137 and cobalt 60 are examples of radioisotopes having energies in the 60 kev to 1.3 mev range that may be selected for use. In some applications it may be desirable to utilize sources having photon energies lying outside this range.

The detector array comprises several detectors shielded from one another in a geometrical configuration. Each detector generates a signal in response to radiation received from the source on the object to be located. The magnitude of each detector signal is proportional to the amount of radiation or flux or number of gamma photons per unit time impinging on the detector at its particular position in the array relative to the remote source of radiation.

The detector signals are electronically processed either by analog or digital techniques to provide an indication of the range and angle of the source object relative to the detector object.

In a preferred embodiment of the present invention, range and angular position, in one plane, such as the azimuthal plane, are determined with an array having four shielded scintillation detectors. To provide indications of the range and angular position between source and detector, the outputs of the detector crystals are combined linearly to form analog signals proportional in amplitude to sum and differences of the crystal responses. The use of four detectors, rather than a lesser number, is considered advantageous because the information is in a form better suited to electronic data reduction and an improved signal-to-noise ratio is provided. The four detector array provides analog signals that vary with respect to the angular position of the source as sinusoids having peak excursions from the average radiation level for values of source angular positions that are displaced by 180°. Because peak signal variations from the average signal amplitude occur for displacements of the source, the data derived can be processed easily. Facile processing occurs because it can be validly assumed that sinusoidal variations of radiation occur with respect to source position.

According to another aspect of the present invention, background radiation effects, as well as the effects of radiation leakage to the shadowed crystals, are minimized. Because these constant level radiation effects are removed, the measurement of range and angle between the source and detector are made more accurate than if background radiation and leakage are ignored.

Basically, the constant radiation effects are removed by measuring only the amplitude of the detected radiation on the several crystals about an average level. In one embodiment, average radiation level is derived by summing the responses of all the crystals and dividing by the number of crystals. The resultant quantity is subtracted from the outputs of each of the crystals to derive signals indicative only of the angular position of the source relative to the detectors. Utilizing the same basic approach to derive an indication of the range of the source from the detecting array, the average value is squared and subtracted from the sum of the squares of the outputs of the several crystals. According to another embodiment of the invention, the constant radiation effects are removed by modulating in a sinusoidal manner at constant frequency the radiation emitted from a source. The receiver includes, in such an instance, a high pass filter for passing the modulated energy received thereby and rejecting the DC components due to background and leakage radiations.

According to a further aspect of the present invention, the relative range and azimuthal position of a plurality of adjacently located objects, such as helicopters in formation, are indicated at each object in the group. Considering the specific case of helicopters, each helicopter is equipped with a radiation source that is modulated at a frequency which is different for each craft in the formation. Each helicopter is also equipped with a detector of the type specified supra and with apparatus for separating the frequency components of the adjacent crafts. From the signals derived in response to each frequency, data processing equipment on board each helicopter derives signals indicative of the relative range and azimuthal position between it and the other helicopters in the formation. The range and azimuthal signals are derived as voltages that are displayed on a plane position indicator display, such as employed in a radar system.

Since a stationary detector is employed in the present invention, rather than a rotating detector, as generally is the case in radar systems, the manner in which the range and azimuthal information is presented on the cathode-ray tube of a PPI indicator differs materially from prior art systems. In particular, the cathode-ray beam of the PPI is displayed synchronously with the output of a beam deflecting circle generator in response to azimuthal indicating voltages derived from the difference signals. The amount by which the cathode-ray beam is deflected is controlled by the amplitude of a range indicating voltage generated.

In the helicopter formation keeping system, a problem arises with regard to difficulties encountered in separating the received signals from the several adjacent radiation sources at different frequencies. The frequency spread between the different modulated sources on board the helicopters in the formation is not usually sufficiently great to enable conventional band-pass filter techniques to be employed. In consequence, it has been found that synchronous detection techniques must be employed for passing the frequency of interest and attenuating the other frequencies prior to passing the signal derived from one source to its particular computation channel. A problem arises, however, in deriving reference frequency and phase signals on board a helicopter which is removed from another helicopter and is in no communication therewith except by the penetrating radiation source. To obviate this problem, a phase locked loop responsive to the sum of the energies derived from all of the scintillation crystals is provided for each modulation frequency of the sources on board the other helicopters in the formation. The phase locked loop for each frequency establishes a voltage of reference frequency and phase suitable for driving synchronous detectors in range and azimuthal processing channels for each target.

It is, accordingly, an object of the present invention to provide a new and improved system for determining the relative distance and angular position between a radiation source and stationary detector.

It is another object of the present invention to provide a new and improved system for measuring the range and angular position between a source of penetrating radiation and stationary detector of said radiation, wherein the penetrating radiation source is of the low energy-type, whereby radiation hazards are minimized, penetration of the radiation through the air is with minimum attenuation and radiation striking the detector is mainly confined to the outer surfaces thereof.

It is another object of the present invention to provide a new and improved ranging and angle measuring system utilizing penetrating radiation wherein the effects of constant level radiation on the detector are minimized.

An additional object of the present invention is to provide a new and improved array of scintillation detectors responsive to relatively low energy penetrating radiation, whereby a relatively large difference in count rate is derived by those detectors exposed directly to the source relative to the detectors which are shadowed from the source by the other detectors and by shield means provided between the various detectors.

A further object of the present invention is to provide a new and improved system for determining the relative distance and angular location of a plurality of radiation sources relative to a detector.

Still an additional object of the present invention is to provide a plane position indicating system to be utilized in conjunction with a stationary nonscanning array of radiation detectors.

A further object of the present invention is to provide a system for providing an indication of the relative range and direction of a plurality of radiation sources relative to a radiation detector, wherein the sources at locations remote from the detector are modulated at different frequencies and the detector includes means for separating the different frequencies and calculating the relative range and position of the various sources.

The above and still further objects, features and advantages of the present invention will become apparent upon consideration of the following detailed description of several specific embodiments thereof, especially when taken in conjunction with the accompanying drawings, wherein:

FIG. 1 is a schematic illustration of one embodiment of the present invention;

FIG. 2 is a graph of the response of the apparatus of FIG. 1;

FIG. 3 is a block diagram of the computer and indicator networks of FIG. 1;

FIG. 12 is a circuit diagram of the data processor employed in FIG. 10;

FIG. 13 is a block diagram of the computer employed in FIG. 12;

FIG. 14 is a circuit diagram for one of the range computers illustrated in FIG. 12; and FIG. 15 is a circuit diagram for the indicator of FIG. 10.

Figure 4:
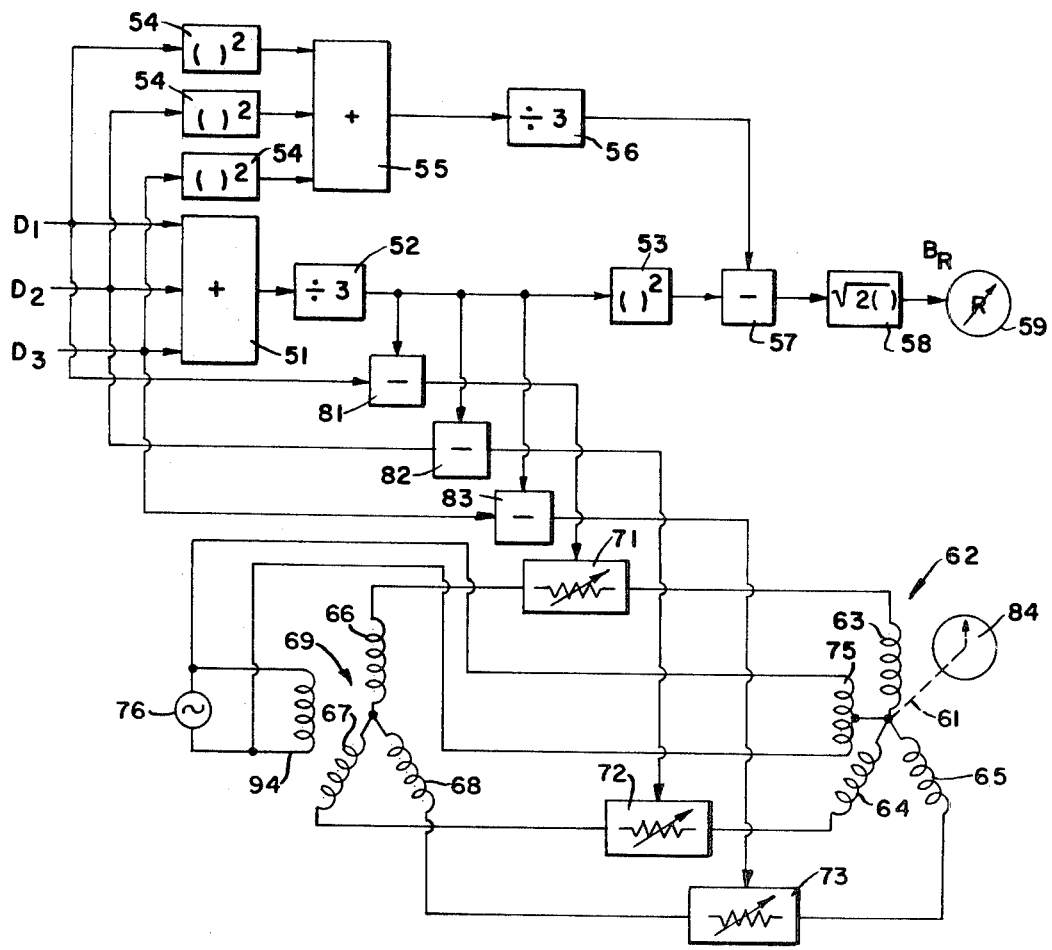
FIG. 4 is a second embodiment of the computer and indicator elements of FIG. 1.

Reference is now made to FIG. 1 of the drawings wherein a penetrating radiation source 21, or an X-ray source, is illustrated. Emission from penetrating radiation source 21 is penetrative of clouds and fog, as indicated by the definition supra. In addition, the energy level, i.e., number of counts of radiation per second, decreases in a well-known and defined manner as a function of distance in accordance with:

$$B_R = \frac{Ke^{-\frac{R}{\lambda}}}{R^2} \quad (1)$$

where: $B_R$ is the amount of energy arriving at a point $R$ units removed from source 21;

$K$ is a constant dependent upon source 21 and a detector located at a distance $R$ units from the source;

$e$ is the base of the natural logarithmic system;

$R$ is the distance between source 21 and the point where the radiation is being received; and $\lambda$ is the mean free path length which is related to the attenuation constant of the medium through which the radiation propagates.

Positioned to receive energy from source 21, at a range from the source generally not in excess of 1,000 feet, is fixedly mounted or stationary receiver array 22, i.e., array 22 is not scanned. Receiver array 22 comprises three scintillation crystals 23—25, symmetrically arranged about a common axis S. Hereinafter, an improved detector array is described. Each of scintillation crystals 23—25 has an arcuate outer surface covering approximately 120° of arc so that the entire array forms a circle. Between scintillation crystals 23—25 are disposed shields 26, absorptive to the penetrating radiation of source 21.

Penetrating radiation source 21 is selected so that the radiation emitted thereby is in the range of 60 kev to 1.3 mev. In some instances, a higher energy source such as cobalt 60 may be preferred. Moreover, while gamma sources are preferred, sources of alpha or beta radiation may be used in certain applications.

In response to radiation from source 21 impinging on crystals 23—25, the crystals generate light energy in the form of pulses. The pulses of light energy derived by crystals 23—25 are respectively fed to an associated one of the three photomultipliers 27. Each of photomultipliers 27 is responsive to the light energy deriving from a different one of the scintillation crystals, whereby the photomultipliers derive a number of electrical pulses commensurate with the amount of radiation reaching each of the crystals. The pulse rate depends on the flux or number of gamma photons impinging per unit time upon the crystal. The outputs of each photomultiplier is integrated to derive three DC analog signals having amplitude variations directly proportional to the amount of radiation impinging on the corresponding scintillation crystals. The signals derived by the integrators are fed to a computer 28, described *infra*, the output of which is fed to range and position indicator 29.

Because of shields 26 the response, i.e., the count rate or number of counts per second, derived from each of scintillation crystals 23—25 is periodic with respect to the angular position of source 21. The symmetrical arrangement of crystals 23—25 causes the response of crystals 23—25 to be periodic with respect to the angular position of source 21. The response of each crystal is substantially the same but the responses of adjacent crystals are displaced in angular position by 120° relative to each other.

The spatial periodic relationship of the count rate derived from each of scintillation crystals 23—25 is illustrated in FIG. 2 wherein count rate is plotted as a function of the angular position, $\theta$, of detector array 22 relative to radiation source 21. When radiation source 21 is positioned midway between the radial walls of crystal 23, along the line indicated by the arrow $\theta=0$ in FIG. 1, the value of $\theta$ in FIG. 2 is assumed to be 0. As the angular position of the source rotates in a clockwise direction from $\theta=0$, the value of $\theta$ increases in a positive manner, whereby maximum radiation impinges on crystal 24 when the source is positioned midway between the radial sidewalls of that crystal. As shown by FIG. 2, the periodic, spatial response of crystals 23—25 can be considered as essentially sinusoidal, with a variation of magnitude A about an average value of M. The minimum count rate derived from any crystal occurs when the crystal bisector is 180° removed from the source, e.g., if source 21 were at an angle of $\theta=180°$, the response from crystal 23 would be minimum. The minimum response from any of the crystals 23—25 is proportional to the quantity $(M-A)$, which is determined by the background radiation of the environment in which the detector array 22 is located and by the amount of radiation from source 21 that leaks through the shields and crystals which shadow the crystal being considered.

It will now be mathematically shown how the responses from crystals 23—25 can be combined to derive information indicative of the position of penetrating radiation source 21. Assuming sinusoidal variations of the count rate derived from crystals 23—25, the count rates, $D_1$, $D_2$ and $D_3$, for the three crystals can be respectively represented as:

$$D_1 = A \cos \theta + M \quad (2)$$

$$D_2 = A \cos\left(\theta - \frac{2\pi}{3}\right) + M = -\frac{1}{2}A \cos \theta + \frac{\sqrt{3}}{2}A \sin \theta + M \quad (3)$$

$$D_3 = A \cos\left(\theta + \frac{2\pi}{3}\right) + M = -\frac{1}{2}A \cos \theta - \frac{\sqrt{3}}{2}A \sin \theta + M \quad (4)$$

where: $A$ and $M$ are defined supra in conjunction with FIG. 2. From Equations (2)—(4), it follows that:

$$D_1 + D_2 + D_3 = 3M \quad (5)$$

Combining Equations (2) and (5) yields:

$$3A \cos \theta = 2D_1 - D_2 - D_3 \quad (6);$$

and from Equations (3) and (4):

$$\sqrt{3} A \sin \theta = D_2 - D_3 \quad (7).$$

From Equations (6) and (7), the angular location of penetrating radiation source 21 is determined as:

$$\tan \theta = \frac{\sqrt{3}(D_2 - D_3)}{2D_1 - D_2 - D_3} \quad (8)$$

From Equation (8) it is seen that the angular position of radiation source 21 can be obtained from the three analog signals derived in response to the count rates generated by scintillation detectors 23—25. The quadrant of the angle can be determined from the numerator and denominator of the expression in Equation (8), whereby: if the numerator ($n$) and denominator ($d$) are both positive, $\theta$ is in the first quadrant; if $n$ is positive and $d$ is negative, $\theta$ is in the second quadrant; if $n$ and $d$ are both negative, $\theta$ is in the third quadrant; and if $n$ is negative and $d$ is positive, $\theta$ is in the fourth quadrant.

Since the intensity of the radiation from calibrated source 21 decreases in a predetermined known manner as a function of distance, the average value of the count rate derived from scintillators 23—25 can be employed as a measure of the range between source 21 and the detector array 22. The average value of the energy impinging on the three scintillator crystals 23—25 is calculated in accordance with Equation (5), supra, that does not include any terms having angular quantities therein. In consequence, Equation (5) can be utilized to derive an approximate indication of the range between source 21 and array 22 by summing the outputs of the three photomultipliers and integrators 27 and applying the resultant sum to a device calibrated in accordance with Equation (1).

A more precise manner for obtaining the range between source 21 and array 22, provided the background radiation is isotropic, i.e., the same regardless of the orientation of array 22, is to compute the amplitude of the count rate sinusoidal variation, the quantity $A$ in FIG. 2. By calculating the amplitude of the count rate variation for a particular orientation, the effects of background radiation and radiation leakage through the crystals and shields, indicated by the quantity $M-A$) in FIG. 2, are obviated.

The value of $A$ is derived by squaring each of Equations (2), (3) and (4), to derive:

$$D_1^2 + D_2^2 + D_3^2 = (3/2) A^2 + 3^2 \quad (9).$$

Squaring Equation (5) and substituting into Equation (9) yields:

$$A = \sqrt{2}\left[\frac{D_1^2 + D_2^2 + D_3^2}{3} - \left(\frac{D_1 + D_2 + D_3}{3}\right)^2\right]^{1/2} \quad (10)$$

It is noted that Equation (10) provides a measure of the amplitude variation of the energy impinging on array 22, hence a measure of the distance between source 21 and the array in accordance with functions that are not dependent upon angular relationships. After solving Equation (10) for the quantity $A$, the range between array 22 and source 21 is calculated in accordance with a calibration based upon Equation (1).

Consideration is now given to the apparatus utilized for determining the relative range and angular position between radiation source 21 and array 22 by reference to FIG. 3, a circuit diagram for the computer 28 and indicator 29 of FIG. 1. Analog signals having magnitudes proportional to the count rates derived by scintillation crystals 23, 24 and 25, are derived from photomultipliers and integrators 27 as DC signals represented by $D_1$, $D_2$ and $D_3$, respectively, FIG. 3. The signals $D_2$ and $D_3$ are supplied to subtraction network 31, which derives a DC output voltage proportional to $(D_2-D_3)$. The DC signal derived from subtraction network 31 is multiplied by a constant, the square root of three, in proportioning network 32, the output of which is indicative of the numerator of Equation (8) and is supplied as one input to division network 33. The signals $D_2$ and $D_3$ are also supplied to adding network 34, the output magnitude of which is a DC voltage proportional to $(D_2+D_3)$. The summation signal derived by network 34 is subtracted from the DC voltage $2D_1$, derived by multiplying the $D_1$ input by two in proportioning network 35. The subtraction operation is accomplished in network 36, the output of which is a DC voltage proportional to $(2D_1-D_2-D_3)$, the denominator of the expression indicated by Equation (8). The value for tangent $\theta$ is derived by dividing the output of proportioning network 32 with the output of subtractor 36 in division network 33, the output of which is indicated by Equation (8). The DC signal generated by division network 33, indicative of tangent $\theta$ is supplied to DC voltmeter 37, calibrated in accordance with the inverse tangent function, whereby a reading between 0 and slightly less than 90° is derived from the visual indication on the face of meter 37.

To determine in which of the four quadrants radiation source 21 is located, the outputs of proportioning network 32 and subtraction circuit 36 are supplied to threshold detectors 38 and 39, respectively. In response to a zero or positive voltage applied thereto, each of detectors 38 and 39 derives a binary one signal on its output lead 41 while a zero voltage is derived by the detectors on lead 42. Conversely, binary one and binary zero voltages are derived on leads 42 and 41 by detectors 38 and 39 in response to a negative voltage being applied to them. The outputs of threshold detectors 38 and 39 are supplied to four AND gates 43, each of which drives a separate neon glow indicating tube 44. AND gates 43 are connected with the outputs of threshold detectors 38 and 39 so that the quadrant one lamp, $Q_1$, is energized in response to the inputs to detectors 38 and 39 both being positive; the quadrant two lamp, $Q_2$, is activated in response to the input to detector 38 being positive and the input to detector 39 being negative; the quadrant three lamp, $Q_3$, is actuated in response to the inputs to both detectors 38 and 39 being negative; and the quadrant four lamp, $Q_4$, is energized in response to the input to detector 38 being positive while the signal applied to detector 39 is negative. Hence, to determine the position of source 21, it is merely necessary for an operator of the equipment to observe the position of the needle of meter 37 and note which of the four lamps 44 is lit.

To measure the range between source 21 and array 22, the signals $D_1$, $D_2$ and $D_3$ are supplied to addition network 45, the output of which is a DC voltage independent of angle, as indicated by Equation (5), and proportional to the average value of the radiation impinging on array 22. The DC signal generated by adder 45 is supplied to DC voltmeter 46, calibrated in accordance with Equation (1) to provide a reading for the range, R, between source 21 and detector array 22.

To determine the range between source 21 and detector array 22 in a more precise manner, with a background of isotropic radiation, the computer 28 of FIG. 1 is modified to solve Equation (10), with the apparatus illustrated in FIG. 4. In FIG. 4, the three DC signals proportional to the responses of scintillation crystals 23, 24 and 25, respectively $D_1$, $D_2$ and $D_3$, are applied to DC summation network 51, the output of which is divided by three in proportioning resistor 52. The DC voltage derived by resistor 52 is supplied to conventional squaring device 53, the output of which is proportional to and indicative of the first term within the brackets of Equation (10). To derive the second term within the brackets of Equation (10) in physically realizable form, each of signals $D_1$, $D_2$ and $D_3$ is supplied to a different one of squaring networks 54. The DC voltages generated by squaring networks 54 are summed together in adding network 55, the output of which is divided by three in proportioning network 56. The DC voltage generated by proportioning network 56 is linearly combined with the DC voltage generated by squaring network 53 and subtraction network 57. The output of subtraction network 57 is multiplied by two and the resultant product is square-rooted in network 58, having an output that is a DC voltage varying in accordance with Equation (10). The quantity $A$ in Equation (10), commensurate with the value $B_R$ in Equation (1), is supplied to DC voltmeter 59, calibrated in the same manner as voltmeter 46, i.e., in accordance with Equation (1), whereby the position of the meter needle is indicative of the range between source 21 and array 22.

The apparatus of FIG. 4, in addition to providing a more accurate indication of range between source 21 and array 22, utilizes a network different from that illustrated by FIG. 3 for indicating the angular position of source 21 relative to stationary array 22. In general, the apparatus of FIG. 4 derives information concerning the angular position of source 21 by relying directly upon Equations (2)—(4) to derive voltages for positioning the rotor 61 of three-phase synchro 62. The three stator windings 63—65 of synchro 62 are interconnected with corresponding stator windings 66—68 of synchro transformer 69 via variable voltage controlled resistances 71—73. Primary winding 74 of synchro transformer 69 and rotor winding 75 of synchro receiver 62 are driven in parallel by a suitable AC source 76, which in a typical embodiment is from a 60-cycle, 120 volt outlet.

Each of resistors 71—73 is of the variable type, controlled in response to the magnitude of a control signal applied thereto. With no signal or 0 volts applied to the control input of resistors 71—73, each of them has the same value; as the control input signals to the resistors increase in a positive and negative manner, the values of the resistors vary in a corresponding proportional manner. Control for resistors 71—73 is in response to the outputs of subtraction networks 81—83, respectively. Each of subtraction networks 81, 82 and 83 has one of its input terminals responsive to the input signals $D_1$, $D_2$ and $D_3$, respectively. The other input terminal of each of subtraction networks 81—83 is responsive to the DC signal indicative of the average value of the radiation impinging on array 22, as derived by proportioning network 52. Thereby, subtraction networks 81, 82 and 83 derive output voltages respectively proportional to:

$$e_{81} = A \cos \theta \tag{11}$$

$$e_{82} = A \cos \left( \theta - \frac{2\pi}{3} \right) \tag{12}$$

$$e_{83} = A \cos \left( \theta + \frac{2\pi}{3} \right) \tag{13}$$

It is noted that Equations (11)—(13) contain no components indicative of the average level of the radiation impinging on array 22 but have a common factor multiplied solely by information responsive to the angular position of source 21. The output signals derived by subtraction networks 81, 82 and 83 are supplied to variable resistors 71, 72 and 73, respectively, to control the values of the resistors.

Because coils 63—65 are positioned in a spatial relationship corresponding with the angular position of crystals 23—25 and the voltage magnitudes applied to the coils or windings are dependent upon the radiation impinging upon each of the crystals (values indicative of the angular position of source 21), rotor winding 61 is turned by an angle commensurate with the location of source 21. Hence, an indication of the angular location of source 21 is derived by connecting pointer 84 to rotor 61 and providing a circular scale indicative of degrees for the pointer to ride upon.

The angle readout system of FIG. 4 is generally preferred to that illustrated in FIG. 3 because it is not necessary to calculate the value of tangent $\theta$, a quantity that can approach infinity as $\theta$ approaches 90° or odd integral multiples thereof. It is also to be understood that the system of FIG. 4 can be modified by substituting a three-yoke cathode-ray tube for the synchro readout. In a system employing a three-yoke cathode-ray tube, each of the coils in the yoke is disposed at 120° with respect to the other and readout is derived by forming the cathode-ray beam as a line that is deflected in response to the magnetic fields generated by the yoke coils.

Figure 5:
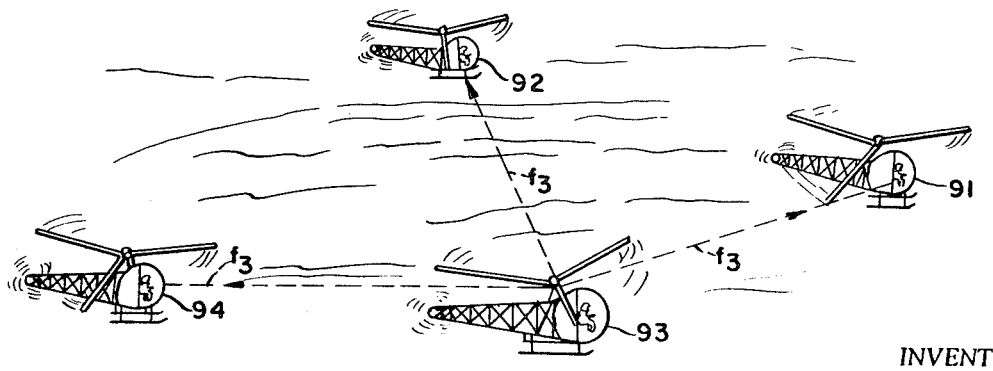
FIG. 5 is a schematic drawing illustrating the manner in which the present invention is employed for helicopter formation keeping.

The system of FIGS. 1, 3 and 4 can be modified, in a manner described *infra*, to enable a plurality of helicopters, as illustrated by FIG. 5, to maintain close order formation, whereby each helicopter in the formation is apprised of the relative range and azimuth of the other helicopters. In FIG. 5, four helicopters 91, 92, 93 and 94 are illustrated as comprising the crafts flying in formation. Each of helicopters 91—94 is provided with a source of penetrating radiation that is modulated sinusoidally at a different frequency, denominated as $F_1$, $F_2$, $F_3$ and $F_4$ for helicopters 91, 92, 93 and 94, respectively. In each helicopter, the penetrating radiation source is mounted on the craft immediately below the main rotor while the detector on each craft is positioned below the cockpit area, whereby an omnidirectional response is derived. The stationary detector array on board each of the helicopters receives the continuously emitted but sinusoidally modulated radiation from the other helicopters and separates the signals on the basis of frequency content. Thereby, each craft is identifiable in the signal processing apparatus of the receiving craft and signals indicative of the azimuth and range of the other crafts in the formation can be derived on board the receiving craft.

Figure 6:
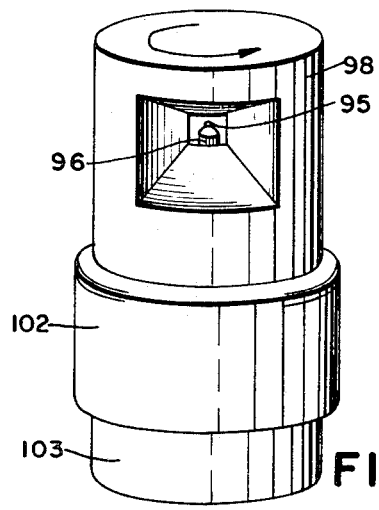
FIG. 6 is a perspective view of the radiation source employed on each of the helicopters illustrated in FIG. 5.
Figure 7:
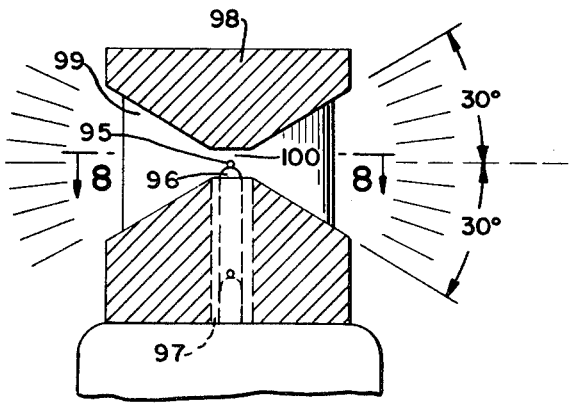
FIG. 7 is a vertical cross-sectional view of the radiation source illustrated in FIG. 6.
Figure 8:
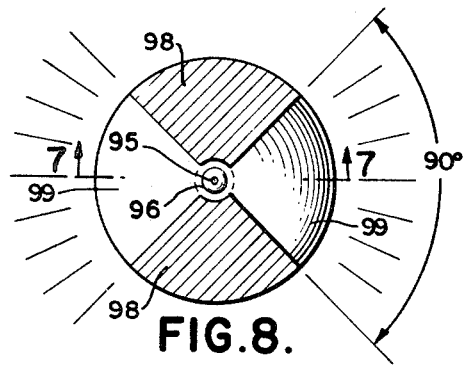
FIG. 8 is a horizontal sectional view of the radiation source illustrated in FIG. 6.

A typical configuration for the radiation source utilized on helicopters 91—94 is illustrated in FIGS. 6—8. A nucleonic source 95, preferably cesium 137, is fixedly mounted on the end of translatable rod 96. Rod 96 is vertically translatable within centrally located bore 97 of rotatable lead shield 98 so that if no position information is desired source 95 is always shielded. Shield 98 includes a pair of outwardly tapering apertures or windows 99 that are connected together by a centrally located passageway 100 within the shield.

During normal operation of the source illustrated by FIGS. 6—8, calibrated cesium 137 nucleonic energy capsule 95 is located within passage 100 and shield 98 is rotated at a predetermined constant velocity by synchronous motor 102. Synchronous motor 102 is supplied with a signal by converter 103 to maintain the rotational speed of shield 98 essentially constant at the predetermined value. As shield 98 rotates, the energy derived from capsule 95 is sequentially attenuated and coupled to the exterior environment. Because there are two windows 99 in shield 98, the shield is rotated at a velocity one-half that of the sinusoidal variation of the count rate supplied by source 95 to the remaining helicopters in the formation. To provide a collimated beam of nucleonic energy, the taper of windows 99 covers an arc of 60° or more in the vertical plane and 90° in the horizontal plane, as illustrated by FIGS. 7 and 8, respectively.

Figure 9:
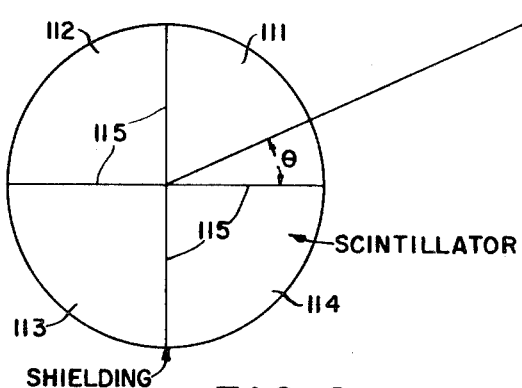
FIG. 9 is a top view of a preferred embodiment for the detector utilized on the helicopters shown in FIG. 5.
Figure 10:
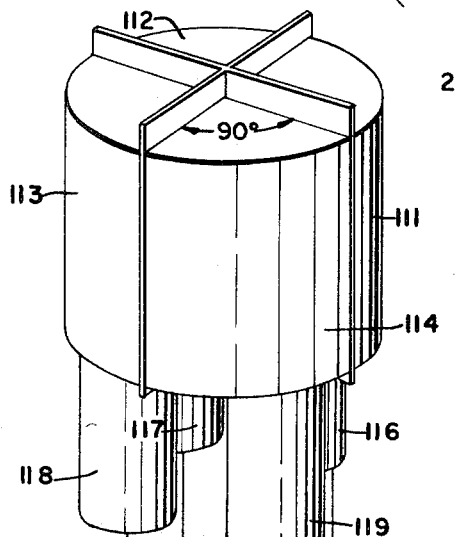
FIG. 10 is a perspective view of the detectors schematically shown by FIG. 9 in combination with computing and indicating means.

The detector array fixedly mounted on board each of helicopters 91—94 is illustrated by FIGS. 9 and 10. As illustrated by FIG. 9, a top view of the detector, four scintillation crystals 111—114, symmetrically arranged about a common axis, are juxtapositioned and separated mutually from each other by shields 115. Each of detectors 111—114 comprises approximately one-quarter of the area of a circle to form on its outer edge an arcuate surface subtending an angle of 90°. As in the configuration of FIG. 1, the crystals shield each other or provide a relative shadow effect.

Due to the reasons described above, the four-crystal arrangement of FIGS. 9 and 10 is considered superior to the three-crystal arrangement of FIG. 1. In addition, with the four detector array, a null occurs every 90° of rotation rather than 120°. Because at least two detectors are always exposed to a source, the configuration of FIGS. 9 and 10 provides more accurate indications of the angular position and range of the source to the array. In addition, by having a minimum every 90°, rather than every 120°, the four-crystal configuration provides improved definition for the angular readout of the source location.

The scintillation counts derived from crystals 111—114 are respectively coupled to photomultipliers 116—119 which generate electrical pulses varying in amplitude and number in accordance with the light energy derived from the scintillation crystals. The pulses generated by photomultiplier tubes 116-—119 are fed to data processor 120 that produces output signals for driving range and azimuth indicator 121. In data processor 120, the low frequency modulation components imposed on the radiation sources of the other craft in the formation are separated for processing. In response to each of the separately derived signals the range and azimuth position of the other crafts in the formation are determined. These signals are fed to a conventional indicator, such as a plane position indicator cathode-ray tube, in a manner described *infra*. Since the array comprising crystals 111—114 is stationary and not scanned, the apparatus for deriving signals for display of target information differs from that utilized in conventional radar-type PPI devices.

Figure 11:
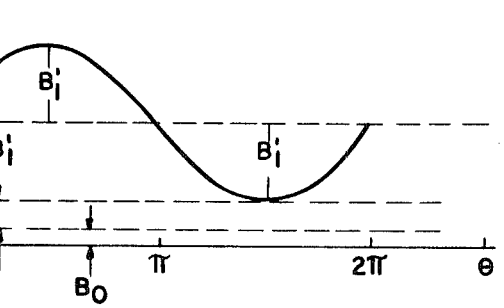
FIG. 11 is a graph derived from one of the receiving transducers of FIG. 10, wherein amplitude is plotted as a function of source angle.

Consideration will now be given to the manner in which the count rates from a pair of scintillation crystals varies as a function of the angular position of a source, wherein the angular position of the source, denominated as $\theta$, is equal to zero when the source is aligned with the shield 115 disposed between crystals 111 and 114. As indicated by FIG. 11, the sum of the count rates of crystals 111 and 112 is a periodic, sinusoidal function having an average value equal to $E'_1 + B'_1 + B_0$; where:

$E'_1$ is a count rate amplitude factor depending upon the range of the source;

$\alpha$ is a contrast factor (preferably less than 0.1), i.e., a factor indicative of the radiation leakage through the shields 115 and the shadowing effect of the crystals disposed between the source and the crystal under consideration; and $B_0$ is the count rate of natural background radiation, which is assumed validly to be isotropic about the vertical and thereby independent of $\theta$.

In view of the foregoing definitions, it is seen that the sum of the count rates derived from crystals 111 and 112 is a sinusoid having an amplitude of $E'_1$ about the average value indicated and that the minimum radiation for the sum of the outputs of detectors 111 and 112 is $(B_0 + \alpha B'_1)$. As range varies, the quantity $\alpha B'_1$ changes but the background radiation, $B_0$, remains constant.

While the following analysis presumes that the sum of the count rates derived from scintillation detectors 111 and 112 is sinusoidal as a function of the azimuthal position of the source, it is possible for the variation to deviate slightly from pure sinusoidal form without adversely affecting the performance of the system, provided the actual response has the general properties shown by FIG. 11. Because of the geometrical design of the array comprising scintillation detectors 111-—114, the correct phase relationships prevail even if the responses of the several detectors are slightly changed. Minor symmetrical deviations from the pure sinusoidal response can be compensated in the electronic processing network 119.

It can be shown that the count rates derived from scintillation crystals 112—114, denominated as $D_1$, $D_2$, $D_3$ and $D_4$, respectively, can be combined to provide signals indicative of the average intensity of the radiation impinging on the array and the position of the source in accordance with:

$$D_1 + D_2 + D_3 + D_4 = B'_1(1+\alpha) + B_0 \qquad (14)$$

$$(D_1 - D_3) + (D_2 - D_4) = B'_1 \sin \theta \qquad (15)$$

$$(D_1 - D_3) - (D_2 - D_4) = B'_1 \cos \theta \qquad (16)$$

In the case of a single unmodulated $B'$ *such as would generally occur in a situation different from the helicopter formation keeping arrangement of FIG. 5, Equations* (15) and (16) are employed directly for determining the azimuthal position of the source. A technique similar to that employed in conjunction with FIG. 4 is utilized for accurately deriving information indicative of the range of the source in response to signals derived in accordance with Equation (14). In the presently considered embodiment, however, it is not necessary to utilize such techniques to eliminate the constant terms associated with $B_0$ and $B'_1\alpha$ because each of the sources is modulated. Of course, in a system wherein the sources are modulated, the constant terms are eliminated merely by processing the detected modulation signal through a high pass filter, such as a series capacitor.

Reference is now made to FIG. 12 of the drawings wherein there is illustrated, in block diagram form, a preferred embodiment for the data processing unit 120 of FIG. 10. Each of the signals derived from photomultipliers 116—119 is represented in FIG. 12 by $D_1$, $D_2$, $D_3$ and $D_4$, respectively. Each of the signals $D_1$—$D_4$ is supplied to a different initial processing channel 122—125, each of which is identical in circuit configuration. In consequence, it is believed necessary only to illustrate and discuss specifically channel 122, associated with signal $D_1$.

Pulses in the $D_1$ signal are initially applied to a pulse amplifier 126, having a constant stable gain, which raises the pulse level sufficiently to enable diode 127, connected in its output network, to function in the manner of a perfect diode. Diode 127 is connected through resistor 128 to a positive back biasing voltage at terminal 129, whereby low energy pulses are rejected and are not passed through the diode. Because low energy pulses are not passed through diode 127, the processed signals have greater signal-to-noise ratio than would otherwise be the case. It is necessary, however, to maintain the positive voltage applied to terminal 129 rigidly constant so that the energy level of the count pulses fed through diode 127 does not change and introduce erroneous signal levels into the system.

The current pulses fed through backbiased diode 127 are fed to integrator 131, comprising resistor 132 and shunt capacitor 133. The time constant of integrator 131 is such that its output contains three superimposed sinusoidal voltages, each equal in frequency to the modulation frequency imposed on the three sources mounted on the other helicopters in the formation. The output of integrator 131 is fed to operational amplifier 134, having a feedback resistor 135.

Operational amplifier 134, in combination with its feedback resistor 135, maintains the bias of diode 127 substantially constant because the voltage at its input remains relatively constant, whereby large fluctuations in the pulse rates of signal $D_1$ do not change the bias on diode 127.

The output of operational amplifier 134 is applied to a high pass filter 136 comprising series capacitor 137 and shunt resistor 138. Capacitor 137 passes the AC modulation components superimposed on the sources at the other helicopters in the formation but blocks the constant radiation components, $B_0$ and $\alpha B'_1$, whereby the output of signal detecting channel 122 consists of three superimposed sinusoidal voltages having a zero average value. Each sinusoidal voltage has an amplitude variation dependent upon the magnitude of the calibrated nucleonic energy of source 95 on board the helicopters from which the radiation emanated and the range between the helicopters containing the detector and source. The frequencies of the three AC components passed through capacitor 137 are dependent upon the rotation rates of shields 98 in the other three helicopters in the formation. The frequencies are equal to twice the rotation rates because each shield includes two apertures.

In a manner similar to that described for channel 122, each of channels 123, 124 and 125 responds to the signals derived from photomultipliers 117, 118 and 119, respectively, to derive three AC signals. The superimposed AC signals derived by channels 122, 123, 124 and 125, denominated as $C_1$, $C_2$, $C_3$ and $C_4$, respectively, are fed to computer 141, described *infra*.

Computer 141 responds to its four input signals to derive three AC output signals, each having three AC components respectively proportional to the sum of the inputs to the computer and to various different functions supplied to the computer. The four AC signal carrying leads $C_1$—$C_4$ are supplied to summation network 142, FIG. 13, which derives an output denominated as $\Sigma C$. In contrast, signals $C_1$ and $C_3$ are subtracted from each other in network 143, the output of which is proportional to $(C_1-C_3)$, while the signals $C_2$ and $C_4$ are subtracted from each other in network 144, having an output proportional to $(C_2-C_4)$. The outputs of difference networks 143 and 144 are added together and subtracted in summation network 145, and difference network 146, respectively. Network 145 generates an output voltage having an amplitude at each of the three sinusoidal frequencies commensurate with sine $\theta$, in accordance with Equation (15). The signal derived from difference network 146 contains three AC components, each having a magnitude indicative of cosine $\theta$ for each of the three targets, as indicated by Equation (16).

To determine information indicative of the range and azimuthal position of each target, it is necessary to separate the frequency components of the three AC waves on each of the output leads of computer 141. A straightforward approach to this problem is to apply each of the computer outputs to three parallel high Q filters, the output of which contains AC waves only for the particular target under consideration. It has been found, however, that this straightforward approach is impractical because it is virtually impossible to obtain stable high Q filters at the relatively low modulation frequencies mechanically imposed on the radiation sources of the several helicopters. In consequence, data processor 120 of the present invention separates the various AC components by utilizing synchronous phase detection networks responsive to locally generated waves having frequencies exactly equal to the waves being detected and phase angles precisely related to a reference. In accordance with the present invention, such reference waves are derived on board the receiving helicopter by utilizing phase locked loop techniques.

To provide a more facile manner of describing the operation of the phase locked loop detection technique employed, exemplary values of the modulation frequencies for the radiation sources on board helicopters 92, 93 and 94 are assumed, and it will be presumed that the receiver being considered is on board helicopter 91. The modulation frequencies for the nucleonic sources on helicopters 92, 93 and 94 are assumed, therefore, to be 91 c.p.s., 100 c.p.s. and 111 c.p.s., respectively.

To derive the reference frequency and phase signal at 91 c.p.s. on board helicopter 91, the output $\Sigma C$ of computer 41 is applied through AC amplifier 151 to relatively low Q band-pass filter 152 having a center frequency of 91 c.p.s. Because filter 152 has a relatively low Q, its output contains the components of the 100 and 111 cycle per second signals in the $\Sigma C$ output of computer 141. The output of filter 152 is applied to phase detector 153, also responsive to the output of phase shifter 154, that is adjusted to provide a 90° phase shift for AC signals of frequency 91 c.p.s.

Phase detector 153 is such that it derives a zero output voltage when its two inputs are in phase quadrature relationship, a maximum positive voltage in response to its two inputs being exactly in phase, and a maximum negative voltage when the signals applied to it are 180° out of phase. Phase detector 153 has a relatively long time constant of approximately 10 seconds, whereby its output remains relatively constant even though the 91 c.p.s. signal is lost in noise. The signal derived from phase detector 153 is supplied to voltage controlled oscillator 154, preferably a crystal controlled oscillator of the variable frequency type.

The output of voltage controlled oscillator 154 is supplied to frequency divider 155, which includes conventional non-linear networks adjusted so that the output of oscillator 154 is reduced by a factor of 1100. Divide by 1100 frequency divider 155 feeds phase shifter 154, whereby, under normal operating conditions, the output of phase shifter 154 is an AC wave of 91 c.p.s. that is phase displaced by 90° from the 91 c.p.s. output of filter 152. Under such conditions, phase detector 153 supplies a zero input voltage to oscillator 154 and the oscillator is maintained at its normal operating frequency of 100 kc.

Similar channels to the one described for the 91 c.p.s. signal are provided to derive reference frequency and phase voltages for the 100 c.p.s. and 111 c.p.s. signals by utilizing channels parallel to the 91 c.p.s. signal channel. In the 100 c.p.s. channel, band-pass filter 152.1 is adjusted to have a center frequency of 100 cycles per second, voltage controlled oscillator 154.1 has a normal output frequency of 100 kc and frequency divider 155.1 is adjusted to divide the output frequency of oscillator 154.1 by a factor of 1,000. The channel for deriving the reference phase and frequency signal at 111 c.p.s. includes: band-pass filter 152.2, having a center frequency of 111 c.p.s.; voltage controlled oscillator 154.2 with a normal output voltage of 100 kc; and frequency divider 155.2 adapted to reduce the output frequency of crystal oscillator 154.2 by a factor of 900. Hence, it is seen that frequency dividers 155, 155.1 and 155.2 derive output voltages that are in phase with and have a frequency equal to the frequency components received by helicopter 91 from the nucleonic sources on board helicopters 92, 93 and 94.

The reference frequency and phase signals derived from frequency dividers 155, 155.1 and 155.2 are respectively fed to phase detectors 156, 157 and 158. Phase detectors 156—158 are also responsive to the ΣC output of computer 141 as fed to them through AC amplifiers 159 and band-pass filters 161, 162 and 163, respectively having center band-pass frequencies of 91, 100 and 111 cycles per second.

Phase detectors 156—158 are constructed so that they derive: a zero output voltage when the input signals applied thereto are positive; a positive DC signal in response to the signals applied to them being in phase; and a maximum negative DC output in response to the two signals applied to them being 180° out of phase. In response to a dissimilarity between the reference and signal frequencies applied to phase detectors 156—158, the phase detectors generate zero output voltages since they include an averaging network in their output circuit. The averaging network serves to eliminate any AC components, such as arise when two signals of different frequencies are applied to a phase detector, whereby the output of each phase detector is a DC voltage that is directly proportional to the sum of the radiation impinging on scintillation crystals 111—114 for the particular frequency under consideration.

Specifically, the outputs of phase detectors 156, 157 and 158 are DC voltages indicative of the amount of radiation impinging on scintillation crystals 111—114 from the nucleonic sources on board helicopters 92—94 as received by the transducing array on board helicopter 91. Each of the DC voltages derived by phase detectors 156, 157 and 158 is supplied to a different range converting network 161, 162 and 163, respectively. Each of range converting networks 161—163 is identical in circuit configuration and is adapted to derive a DC output voltage directly proportional to range in response to the input signal applied thereto, in accordance with Equation (1). Since each of the range measuring networks 161—163 is identical, a description of one of the networks by reference to FIG. 14 suffices.

The range converting network of FIG. 14 comprises a high gain operational amplifier 171 having an input resistance 172 connected between the output of the phase detector and the input terminal of the amplifier. Connected in the feedback network of amplifier 171 is a network comprising a plurality of biased diodes 173 in series with variable resistors 174. Diodes 173 and resistor 174 are connected to taps on resistive voltage divider 175, connected between the input terminal of amplifier 171 and a positive biasing voltage at terminal 176. The values of variable resistors 174 are adjusted so that the impedance in the feedback network of amplifier 171 is varied in response to the input signal to resistor 172 in a nonlinear manner, whereby the output voltage of amplifier 171 is related to the input voltage to resistor 172, $B_R$, in accordance with Equation (1). The output voltage of amplifier 171 equals the quantity $R$ in Equation (1) since the input to resistor 172 is equal to the quantity $B_R$. The theory upon which the nonlinear network of FIG. 14 is based is well known and described in the book "Electronic Analog Computers," Korn & Korn, Second Edition, and need not be described further herein. Korn & Korn can also be relied upon to disclose specifically the addition, subtraction, squaring, square rooting and proportioning networks mentioned herein previously.

To derive, on board helicopter 91, azimuthal information for each of the nucleonic sources on board helicopters 92—94, the outputs of addition and subtraction networks 145 and 146 of computer 141 are supplied to frequency separating channels 164 and 165, respectively. Each of frequency separating channels 164 and 165 includes three parallel channels having relatively low Q band-pass filters, centered at frequencies of 91, 100 and 111 c.p.s., cascaded with phase detectors responsive to the outputs of frequency dividers 155, 155.1 and 155.2, respectively. The three channels in network 164 derive information respectively indicative of sin $\theta$ for the nucleonic sources on board helicopters 92, 93 and 94, while the three channels included in network 165 derive information proportional to cos $\theta$ for helicopters 92, 93 and 94.

The three signals derived from each of networks 164 and 165, as well as the range indicating signals generated by networks 161—163, are supplied to range and azimuth indicator 120, one embodiment of which is illustrated specifically in FIG. 15. In the embodiment illustrated in FIG. 15, indicator 120 includes a cathode-ray tube 171 with X-axis deflection plates 172 and Y-axis deflection plates 173. Cathode-ray tube 171 is arranged as a plane position indicator (PPI), similar to the type utilized in the radar art, having a zero coordinate position on the face of the tube at its center. The apparatus of FIG. 15 transposes the outputs of range converters 161—163 and frequency separation networks 164 and 165 into spots on the face of cathode-ray tube 171 that are directly proportional to the distance between helicopter 91 and each of the helicopters 92—94. In addition, the positions of the spots on the face of cathode-ray tube 171 are commensurate with the azimuthal location of helicopters 92—94 relative to helicopter 91.

The apparatus for transposing voltages derived by circuits 161—165 into spots on the face of cathode-ray tube 171 comprises constant speed motor 174, driven by a constant frequency AC source 175. Output shaft 176 of motor 174 drives rotor winding 177 of resolver 178, as well as contacts 179, 180 and 181. Each of contacts 179—181 rotates in a separate circle having its center coaxial with output shaft 176 of motor 174. Contacts 179, 180 and 181 rotate so that they engage, once during each cycle of revolution, contacts 182, 183 and 184, respectively. Contacts 182, 183 and 184 are respectively mounted at the outer ends of rotary shafts 185, 186 and 187, driven in response to the voltages applied to resolver networks 188, 189 and 190.

Each of resolver networks 188—190 is responsive to one of the outputs of each of sine and cosine determining networks 164 and 165. The resolver networks respond to the sin $\theta$ and cos $\theta$ inputs thereof to provide shaft rotation output signals indicative of the angle $\theta$. The specific apparatus utilized in resolver networks 188—190 is illustrated and described on page 106 of the book entitled "Servomechanism Practice" by Ahrendt et al., McGraw-Hill Publishing Co., 1960. In response to the inputs to networks 164 and 165 each of the contacts 182—184 is thereby positioned at an angle about the axis of shaft 176 commensurate with the azimuthal positions of helicopters 92—94 relative to helicopter 91.

Applied to each of contacts 182, 183 and 184 is a DC voltage respectively derived from range translating networks 161, 162 and 163. Hence, each of contacts 179—181 carries a voltage indicative of the range between helicopter 91 and the remaining helicopters in the formation and is positioned at an angle corresponding with the azimuthal relationship between helicopter 91 and the other helicopters in the formation.

The range information carried on contacts 179—181 is converted into a PPI presentation by controlling the radial deflection output of a circle generator applied to plates 172 and 173 of cathode-ray tube 171. The circle generator for cathode-ray tube 171 comprises the orthogonal stator windings 192 and 193 of resolver 178. Windings 192 and 193 are coupled to deflection plates 172 and 173 through variable gain amplifiers or signal multipliers 194 and 195, respectively. Amplifiers 194 and 195 are designed in such a manner that when zero voltage is applied to their control inputs 196, zero voltages are derived from the amplifiers outputs. The gains of amplifiers 194 and 195 are adjusted so that they are directly proportional to the magnitude of the voltages on their control input leads 196, connected in parallel to each of contacts 179—181.

During the time interval when there is no engagement between contacts 179—181 and 182—184, zero output voltage is developed by both of amplifiers 194 and 195, whereby the cathode-ray beam of cathode-ray tube 171 is positioned at the center of the PPI display. In response to one of contacts 179—181 engaging its corresponding contacts 182—184, the electron beam of cathode-ray tube 171 is deflected by an amount proportional to the range voltage applied to the latter set of contacts. The direction in which the electron beam is deflected is determined by the angular position of the engaging contacts because the voltage induced in windings 193 and 193 is related to the position of resolver rotor 177 which corresponds with the position of the engaging rotating contact.

To describe more fully the functioning of the PPI presentation, one specific example will be considered presuming that shaft 185, carrying contact 182, has an angular position of $\theta = 90°$ and that the range voltage applied to contact 182 is one-half the maximum output voltage of network 161 ($E_d/2$). Immediately prior to engagement of contacts 179 and 182, under the assumed conditions, zero voltage is applied to amplifiers 194 and 195, whereby no deflection is imparted to the cathode-ray beam of cathode-ray tube 171. During the instant when contacts 179 and 182 engage, resolver rotor winding 177 is rotated so that zero voltage is applied to the input of amplifier 194 and a maximum voltage ($E_{max}$) is applied to the input of amplifier 195 by windings 192 and 193, respectively. At the instant being considered, the range voltage fed to contact 182 increases the gain of amplifiers 194 and 195 by an amount directly proportional to ($E_d/2$) volts. In consequence, there is derived from amplifier 195 a voltage proportional to the product of $E_d/2$ and $E_{max}$. At the same instant, however, zero voltage is derived from amplifier 194 because there is a zero volt input signal fed thereto. Thereby, the cathode-ray beam of tube 171 is deflected vertically from the origin of the PPI presentation by an amount equal to one-half the maximum deflection but no horizontal deflection of the cathode-ray beam occurs.

As the cycle under consideration continues, zero voltage is again applied to the gain control leads 196 of amplifiers 194 and 195, whereby the beam of cathode-ray tube 171 is returned to the center of the PPI presentation.

Further continuation of the cycle ultimately results in the engagement between contacts 181 and 184, the latter having applied to it a voltage proportional to one-third the maximum detectable range between helicopters 94 and 91, $E_d/3$. Shaft 187, hence contact 184, is assumed for the present example to be positioned at an angular location of $\theta = 210°$, whereby resolver windings 192 and 193 derive DC voltages equal to $$-\frac{1}{2}E_{max}.$$

and $$-\frac{\sqrt{3}}{2}E_{max}.$$

respectively. Variable gain amplifiers 194 and 195 multiply the $$-\frac{E_{max}}{2} \text{ and } -\frac{\sqrt{3}}{2}E_{max}.$$

inputs by the $E_d/3$ range voltage applied to contact 184. In response to the output voltages of amplifiers 194 and 195, the cathode-ray beam of tube 171 is deflected downwardly from its origin by an amount proportional to $(1/6)E_{max}E_d$ and is deflected to the left from the centrally located origin by an amount equal to $$\frac{\sqrt{3}}{6}E_{max}.E_d$$

Thereby, a spot is formed on the PPI indicator face at a radial distance from the indicator origin commensurate with the relative range between helicopters 91 and 94 and at an angular location of $\theta = 210°$, the assumed position between the two helicopters.

In the manner described, the location of helicopter 93 relative to helicopter 91 is also derived and displayed on PPI scope 71. Because of the relatively high speed, such as 60 revolutions per second, at which shaft 176 and contacts 179-181 rotate, the human observer of the scope face sees each of the spots as a continuous dot due to persistence of vision. Thereby, an indication is provided with a PPI presentation of the radial and azimuthal location of each helicopter in the formation without visual contact.

It is also possible to provide, with a substantially duplicate system, an indication of the relative elevation between the several helicopters in the formation. If it is desired to provide elevation information, a pair of scintillation detector arrays, such as illustrated in FIG. 10, are provided in stacked vertical relationship. A shield is provided between the upper and lower sets of scintillation crystals. Difference signals are derived in response to the count rates derived from the upper and lower crystals in a manner similar to that described for the azimuthal case.

While an analog system has been explained above, it should be understood that a digital data handling system may be employed with substantially equal utility. A digital computer may be used to count the derived pulses and otherwise process the data to provide the desired range and angle information.

While I have described and illustrated several specific embodiments of my invention, it will be clear that variations of the details of construction which are specifically illustrated and described may be made without departing from the true spirit and scope of the invention as defined in the appended claims.

I claim:

1. A system for deriving information indicative of the range and angular position of a source of penetrating radiation comprising a stationary array of at least three receivers for said radiation, shield means disposed between said receivers for varying the relative amount of said radiation impinging on each of said receivers in response to the angular position of said source, said shield means and receivers being arranged so that the response of each of said receivers is periodic with respect to the angular position of said source, the periodicity of said receivers being substantially the same but displaced in angular position relative to each other, means for deriving a signal proportional in magnitude to the amount of said radiation impinging on each of said receivers, means for combining said signals for deriving first and second voltages respectively proportional to the range and angular position of said source, means responsive to said voltages for deriving an indication of the range and angular position of said source, said means for combining and deriving said second voltage including means for taking the difference between the signals proportional to the amount of radiation impinging on said receivers, said difference taking means including means for deriving a signal proportional to the tangent of the angle between said source and array. Said array comprising three receivers symmetrically arranged about an axis of the array, the signals derived proportional to the radiation impinging on said three receivers being denominated as $C_1$, $C_2$ and $C_3$, respectively, said combining means forming the signal proportional to the tangent of the angle between said source and array in response to said three signals in accordance with $$\frac{\sqrt{3}(C_2 - C_3)}{2C_1 - (C_2 + C_3)}$$

2. A system for deriving information indicative of the range and angular position of a source of penetrating radiation comprising a stationary array of at least three receivers for said radiation, shield means disposed between said receivers for varying the relative amount of said radiation impinging on each of said receivers in response to the angular position of said source, said shield means and receivers being arranged so that the response of each of said receivers is periodic with respect to the angular position of said source, the periodicity of said receivers being substantially the same but displaced in angular position relative to each other, means for deriving a signal proportional in magnitude to the amount of said radiation impinging on each of said receivers, means for combining said signals for deriving first and second voltages respectively proportional to the range and angular position of said source, and means responsive to said voltages for deriving an indication of the range and angular position of said source, said means for combining and deriving said second voltage including means for taking the difference between the signals proportional to the amount of radiation impinging on said receivers, said array comprising four receivers symmetrically arranged about a common axis of said array, the signals derived proportional to the radiation impinging on said four receivers being denominated as $C_1$, $C_2$, $C_3$ and $C_4$, respectively, said means for combining including means for generating difference signals to $[(C_1-C_3) +(C_2-C_4)]$ and $[(C_1-C_3) -(C_2-C_4)]$.

3. A system for deriving information indicative of the range and angular position of a source of penetrating radiation in a background of said radiation comprising a stationary array of at least three receivers for said radiation, shield means disposed between said receivers, said shield means and receivers being positioned and constructed so that the relative amount of said radiation impinging on each of said receivers is varied in response to the angular position of said source, said shield means and receivers being arranged so that the response of each of said receivers is periodic with respect to the angular position of said source, the periodicity of said receivers being substantially the same but displaced in angular position relative to each other, means for deriving a signal proportional in magnitude to the amount of said radiation, including said background radiation, impinging on each of said receivers, means for combining said signals for deriving an indication of the range and angular position of said source, and means responsive to the amount of radiation impinging on said receivers for substantially eliminating the effect of said background radiation on the magnitude of each of said signals, said means for eliminating including means response to said signal deriving means for deriving a signal commensurate with the deviation of the square of the average amplitude of the radiation level impinging on said receivers from the sum of the squares of the individual radiation levels impinging on said receivers.

4. A system for deriving information indicative of the range and angular position of a radiation source of known amplitude, the amplitude of radiation from said source varying in a predetermined inverse manner as a function of distance, comprising a stationary array of at least three receivers for said radiation, shield means disposed between said receivers, said shield means and receivers being positioned and constructed so that the relative amount of said radiation impinging on each of said receivers is varied in response to the angular position of said source, said shield means and receivers being arranged so that the response of each of said receivers is periodic with respect to the angular position of said source, the periodicity of said receivers being substantially the same but displaced in angular position relative to each other, means for deriving a signal proportional in magnitude to the amount of said radiation impinging on each of said receivers, means for combing said signals for deriving a voltage magnitude proportional to the range of said source, a PPI including a cathode-ray beam and having a coordinate system origin, means responsive to said voltage for deflecting said beam away from said origin by a distance proportional to the range between said source and array, and means responsive to the difference between a plurality of said signals for controlling the angle at which said beam is deflected about said origin in accordance with the angular position of said target.

5. The system of claim 4 wherein said array comprises four receivers symmetrically arranged about a common axis of said array, the signals derived proportional to the radiation impinging on said four receivers being denominated as $C_1$, $C_2$, $C_3$ and $C_4$, respectively, said means for controlling the beam deflection angle including means for generating first and second difference signals respectively proportional to $[(C_1-C_3) +(C_2-C_4)]$ and $[(C_1-C_3) +(C_2-C_4)]$, said PPI including first and second orthogonal deflection means, and means responsive to said difference signal generating means for applying signals proportional to said first and second difference signals to said first and second orthogonal deflection means, respectively.

6. The system of claim 5 wherein said combining means derives a sum signal proportional to $C_1+C_2C_3+C_4$ and includes means responsive to said sum signal for deriving a voltage in accordance with $$B_R = \frac{Ke - \frac{R}{\lambda}}{R^2}$$

where:
$B_R$ = the magnitude of the sum signal;
$R$ = the output voltage of the range voltage deriving means;
$e$ = base of natural logarithms;
$\lambda$ = the mean free path length of the radiation; and
$K$ = a constant.

7. A system for deriving indications of the relative position of a first object and each of a plurality of second objects comprising a separate calibrated source of penetrating radiation mounted on each of said second objects, a nonscanning detector array for said radiation fixedly mounted on the other of said objects, said array including: at least three receivers for said radiation, shield means disposed between said receivers, said shield means and receivers being positioned and constructed so that the relative amount of said radiation impinging on each of said receivers is varied in response to the angular position of said source, said shield means and receivers being arranged so that the response of each of said receivers is periodic with respect to the angular position of said source, the periodicity of said receivers being substantially the same but displaced in angular position relative to each other; means for deriving a signal proportional in magnitude to the amount of said radiation impinging on each of said receivers, means for combining said signals for simultaneously deriving indications of the relative range and angular position between said first object and each of said second objects.

8. The system of claim 7 wherein each of said sources includes means for continuously modulating the amount of radiation emitted thereby, said modulation being at a constant predetermined different frequency for each of said sources, and said indication deriving means includes means for separating said frequencies.

9. The system of claim 8 wherein said frequency separating means includes a phase locked loop for each of said frequencies, said phase locked loop being responsive to the combined signals from said receivers for deriving a separate signal at reference frequency and phase for each of the modulation frequencies, and phase detector means responsive to said combined signals and each of said reference frequency and phase signals.

10. The system of claim 9 wherein said indication deriving means comprises a plan position indicator having a cathode-ray beam, and means responsive to said phase detector means for deflecting said cathode-ray beam to a position commensurate with the relative range and angular position between said first object and each of said second objects.

11. The system of claim 10 wherein said deflecting means comprises means for rotating said cathode-ray beam about an origin of said plan position indicator, and means responsive to said phase detector means for applying a deflecting voltage to said beam proportional to the range between said first object and each of said second objects at a time when the angular position of the beam corresponds with the angular position between said first object and each of said second objects.

12. The system of claim 7 wherein said indication deriving means comprises a plan position indicator having a cathode-ray beam, and means responsive to the combined signals for deflecting said cathode-ray beam to a position commensurate with the relative range and angular position between said first object and each of said second objects.

13. The system of claim 12 wherein said deflecting means comprises means for rotating said cathode-ray beam about an origin of said plan position indicator, and means responsive to the combined signals for applying a deflecting voltage to said beam proportional to the range between said first object and each of said second objects at a time when the angular position of the beam corresponds with the angular position between said first object and each of said second objects.

14. The system of claim 13 wherein said array comprises four receivers symmetrically arranged about a common axis of said array, the signals derived proportional to the radiation impinging on said four receivers being denominated as $C_1$, $C_2$, $C_3$ and $C_4$, respectively, said means for combining including means for generating difference signals proportional to $[(C_1-C_3)+(C_2-C_4)]$ and $[(C_1-C_3)-(C_2-C_4)]$, and means responsive to said difference signals for controlling the deflection angle of said cathode-ray beam.

15. The system of claim 14 wherein said combining means derives a sum signal proportional to $C_1+C_2+C_3+C_4$, means responsive to the sum signal for deriving a voltage proportional to the range of each said objects, and means responsive to said range voltage for controlling the amount by which said cathode-ray beam is deflected.

16. The system of claim 15 wherein said range voltage deriving means responds to said sum signal in accordance with $$B_R = \frac{Ke^{-\frac{R}{\lambda}}}{R^2}$$

where:
$B_R$ = the magnitude of the sum signal'
$R$ = the output voltage of the range voltage deriving means;
$e$ = the base of natural logarithms;
$\lambda$ = the means free path length of the radiation; and
$K$ = a constant.